Figure 1:
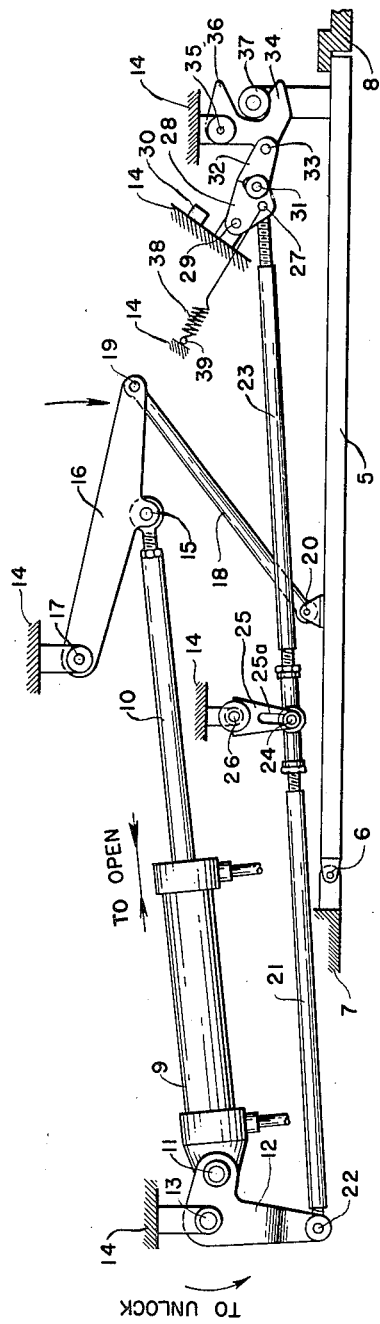

Jan. 23, 1951  F. A. PAYNE, JR  2,538,980
CLOSURE OPERATOR AND LOCK
Filed May 23, 1947

INVENTOR.
Fred A. Payne Jr.
BY
James M. Clark
Attorney

Patented Jan. 23, 1951

2,538,980

UNITED STATES PATENT OFFICE 2,538,980

CLOSURE OPERATOR AND LOCK

Fred A. Payne, Jr., Los Angeles, Calif., assignor to North American Aviation, Inc.

Application May 23, 1947, Serial No. 750,027

11 Claims. (Cl. 268—75)

The present invention relates to operating and locking mechanisms for closures and more particularly to new and improved automatic arrangements of such operating and locking devices for closures and doors.

It has for some time been a problem in the design of closures for retractable landing gears, and other aircraft components, to provide a simple and dependable means for actuating the closure and securely locking the same in its closed position. Numerous locking devices, as well as operating mechanisms, have heretofore been proposed and used, but for the most part these prior devices either have been complicated in their construction, have caused difficulties in the operation of the aircraft to which they were applied, or have been costly both in initial construction and in upkeep. A number of prior efforts have been made to provide automatic latches or locks, many of which utilized slotted levers and spring-opposed compressible links, but few of these earlier expedients have proven entirely satisfactory under actual operating conditions.

The improved arrangement of the closure operating components and the locking mechanism of the present invention obviates the complications of added weight and continual source of production and service difficulties which have been presented by prior door operating and locking mechanisms. The present closure operator and lock is particularly adapted for the operation and automatic locking of retractable landing gear doors for aircraft, and its operating mechanism is so arranged as to make the operation fully automatic, both in the closing and locking of the doors during raising and lowering of the landing gear. The present mechanism also provides positive locking of the doors, and the use of auxiliary units is eliminated by the mechanism being power driven from one main source. The door operating and locking mechanism includes a "breaking" link which serves to hold the door securely in its locked position, the retracting motor being operable to both break the toggle linkage and to swing the door between its closed and open positions.

Figure 2:
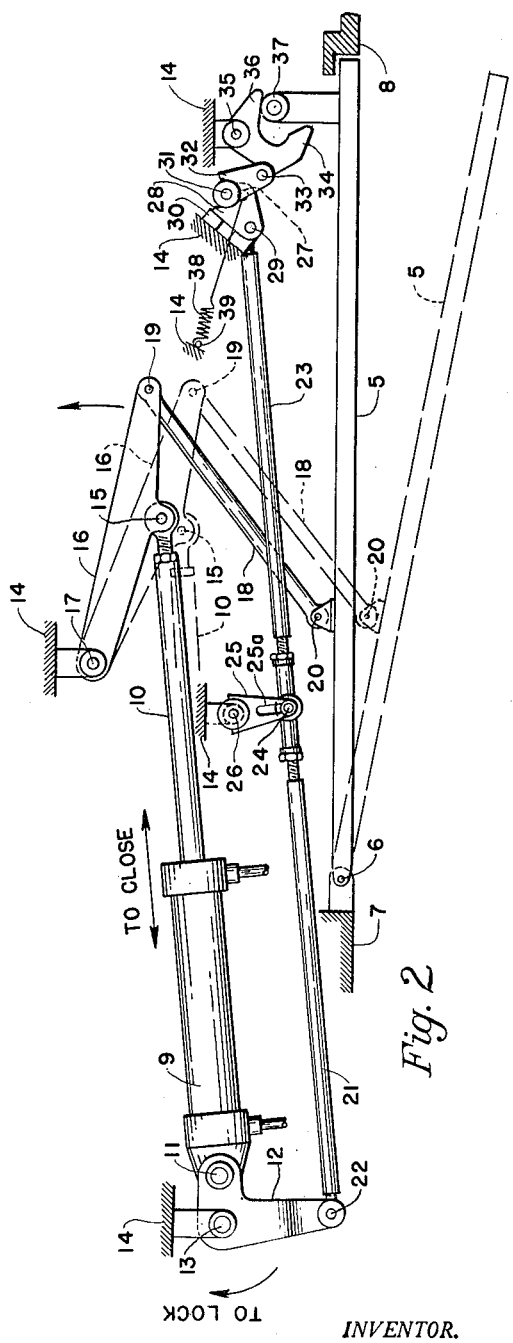

It is accordingly a major object of the present invention to provide an improved operating and locking mechanism for closures or doors, which mechanism comprises a novel arrangement of its component parts such that it is adapted for fully automatic operation, both in closing and locking the doors during the raising or lowering of an aircraft landing gear. It is a further object to provide a closure operating and locking mechanism which incorporates in its linkage simple and fool-proof means for positively locking the door in its closed position. It is a still further object to provide a closure operating mechanism which is compactly arranged to permit being housed within limited spaces, such as within the thickness of an aircraft wing, and mechanism in which certain complicated and troublesome features of the latches of the prior art are eliminated. Other objects and advantages of this invention will occur to those skilled in the art after reading the following description, taken together with the accompanying drawings, in which:

Fig. 1 is a side elevational view of the closure operating and locking mechanism for an aircraft door shown in its closed and latched position; and Fig. 2 is a similar view of the mechanism and door shown in Fig. 1 but with the door unlocked, and in a partially opened position.

The numeral 5 indicates a closure or door pivotally supported at the hinge or pivot 6 carried by the adjacent wall structure 7. The door 5 is capable of pivotation or rotation about the axis of the pivot 6 and in its closed position it is received within the recessed jamb portion indicated by the numeral 8. While the door 5 has been shown and described as being particularly adapted for use with retractable landing gears for aircraft, it will be understood that the present invention is also applicable to doors or closures for other uses.

The power source for the actuation of the door and its latching mechanism is provided by the hydraulic motor or cylinder 9 within which the piston element 10 is reciprocally associated. It will be understood that the hydraulic motor formed by the cylinder and piston elements 9 and 10 respectively will be provided with suitable fluid lines in a well known manner on each side of the piston with suitable control valves for controlling the operation of the actuating motor. On the other hand, an electric or other motor of the extensible type may be substituted for the hydraulic motor shown, and equally good operational results will be obtained.

That end of the cylinder 9 which is further away from the piston rod 10, is pivotally connected at 11 to a bell-crank 12, which in turn is pivotally mounted at the pivot 13 upon the adjacent supporting structure 14. The outer end of the piston rod 10 is provided with an adjustable pivot connection 15 which is pivotally mounted upon the link or arm 16 intermediate its end portions. The arm 16 is pivotally mounted at one end at the pivot 17 to the supporting structure 14, and at its opposite end the arm 16 is pivotally connected to the link 18 through the medium of the pivot 19.

The door 5 is provided on its inner side with a pivotal connection 20 intermediate its hinge axis 6 and its outer end adjacent the jamb 8, and this pivotal connection 20 is connected to the lower terminal of the link 18. The relative arrangement of the piston 10, the arm 16 and the link 18 is such that any pull to the left by the piston rod 10 exerted at the pivot 15 will cause the door 5 to be opened, assuming the door is unlatched; and conversely any movement of the pivot 15 to the right, or outwardly from the cylinder 9, will cause the arm 16 to be rotated in a counterclockwise direction and will rotate the door in the same direction through the medium of the link 18, or into its closed position.

The lower terminal of the bell-crank 12 is pivotally connected to the near section of a push-pull rod 21 through the medium of the pivotal connection 22. The far section of the push-pull rod is indicated at 23, and is pivotally connected or articulated to the near section 21 through the intermediate pivot 24. The latter pivot is rotatively carried at the lower terminal of the swinging link 25 which is pivotally supported at 26 from the supporting structure 14. The far end of the further push-pull rod 23 is provided with an adjustable terminal which is pivotally connected through the pivot 27 with the near link 28 of the "breaking" linkage 28—32.

This near link 28 is pivotally mounted at 29 upon the adjacent structure 14 from which is also supported a stop member 30 against which the link 28 is adapted to bear at the limit of its movement after the linkage has been "broken." The other link of the "breaking" linkage pair is indicated by the numeral 32, and these two links are joined together at their common pivot 31. The link 32 is pivotally attached at 33 to the latch element 34 which in turn is pivotally mounted upon the supporting structure 14 at the pivot 35. The latch 34 is provided with a lug portion 36, extending laterally from its pivotal connection 35, and the door 5 is provided with a pin 37 adjacent its outer end which pin is adapted to cooperate with the lug 36 in rotating the latch 34 to retain the door in its closed and locked position. A tension spring 38 is connected to the pivotal connection 27 and is anchored at its opposite end at 39 to the adjacent structure 14. It will be noted from a comparison of the relative positions of this spring in Figs. 1 and 2 that an over-center action is provided whereby the spring serves to hold the "breaking" links 28—32 in either position. When a line drawn between the pivot 27 and point 39 passes above and beyond the axis of the pivot 29 the spring serves to hold the "breaking" links 28 and 32 in their broken position, as indicated in Fig. 2. Conversely, when the line drawn between the pivot 27 and point 39 falls below the axis of the pivot 29 the "breaking" links 28 and 32 will be retained in the unbroken position as indicated in Fig. 1. The spring 38 prevents the inadvertent displacement of the toggle linkage which might otherwise result from vibration, or even the weight of the links themselves.

The push-pull rod assembly 21—23 which interconnects the bell-crank 12 with the "breaking" links 28—32, (and the latch 34) is provided with the idler link 25 to derive several advantageous results not obtainable by a single extended push-pull rod running from the pivot 22 to the pivot 29. This idler link provides a support for the central portion of a relatively long push-pull rod which would otherwise be susceptible of developing undesirable vibration characteristics, particularly when used in aircraft. The idler link 25 also provides a means by which the movement of the push rod 23 may be widely adjusted by providing the pivotal connection of the link 21 at a point nearer to or farther from the idler pivot 26 than the pivot at which the far rod 23 is attached. It is of advantage to provide for this adjustment or variation to the full throw of the "breaking" links for a given throw of the bell-crank 12, and this may either be accomplished through the adjustable terminal connections shown at the ends of the push-pull rods 21 and 23, or by means of adjusting the location of the respective pivot axes 24 of the links through the slots 25a in the idler link 25. The intermediate idler support of the long push-pull rod assembly 21—23 also provides a means of insuring the rods clearing intermediate moving parts, as well as providing greater rigidity and accuracy of the latching mechanism while permitting a reduction in weight.

The operation of the closure and its actuating and locking mechanism is as follows; starting with the closed and locked position shown in Fig. 1, inward or foreshortening movement of the piston and piston rod 10 within the cylinder 9, tends to rotate the member 16 in the clockwise direction as indicated by the adjacent arrow. The force exerted by the cylinder 9 and the piston rod 10 also initially tends to rotate the bell-crank 12 in the counter-clockwise direction, as indicated by the adjacent arrow, and the push-pull rod 21—23 is moved toward the right, tending to force the pivot 27 to the right toward the common pivot 31 of the pair of "breaking" links 28—32. Simultaneously, there is a downward force being exerted on the pin 37 through the door 5 and the links 18 and lever 16, which force tends to rotate the latch 34 in a clockwise direction. The initial movement under the actuation of the piston and cylinder in a door opening operation tends to move the point 31 upward and to the right until it passes through the dead-center position defined by a line connecting the axes 29 and 33. Beyond this point the force which is being simultaneously exerted upon the door pin 37 causes the latch 34 to rotate about the center 35. In the final stage both the linkage 21—23 acting upon the member 28 and the latch 34 acting upon the member 32 are combining their force to effect the final "breaking" action of the toggle whereupon the door is fully released. The "breaking" links thereupon will be rotated to the relative positions shown in Fig. 2, being maintained against the stop 30 by the spring 38.

In the operation of the device to move the door from an open position, such as shown in dotted lines in Fig. 2, to a closed position the actuating motor 9—10 moves from a foreshortened to an extended position. As the pivot 15, at end of the piston rod 10, is moved outwardly or toward the right, the lever 16 is rotated in a counter-clockwise direction, pulling the door 5 upwardly into its closed position through the medium of the link 18. As the door 5 approaches its closed position, the pin 37 strikes the extending lug 36, causing the latch 34 to rotate about its pivot 35 and to again move the pivot 31 past the dead-center line connecting the pivots 29 and 33. The "breaking" links 28 and 32 are again extended and aligned in a position in which their common pivot 31 is below or beyond the dead-center line joining the pivots 29 and 33. This alignment of the "breaking" links causes the latch 34 to be automatically secured in its locked position in which it prevents outward or downward movement of the pin 37.

When the door is being closed (from the dotted line position shown in Fig. 2) through the application of force from the piston and cylinder through lever 16 and link 18, a force is simultaneously applied to the linkage 21—23 through casing 9 and bell crank 12. There is, however, an over-center arrangement in that the point 27, where the rod 23 attaches to the link 28, is above the line drawn between the centers 24 and 29 about which latter point the link 28 pivots. Consequently, the force exerted through the linkage 21—23 is incapable of resetting the "breaking" link combination 28—32 until the pin 37 on the door coming in contact with the extension 36 causes the latch 34 to rotate about the pivot 35. This rotation draws the link 32, pivotally attached at 33, to the right sufficiently to rotate the link 28, interconnected at 31, far enough to move the attachment point 27 to a point below the line drawn between the centers 24 and 29. Upon the point 27 passing the dead-center position the force acting upon the linkage 21—23, together with the closing action of the door, combine to effect the actuation of the toggle linkage to engage the latch and retain the door. The "breaking" link combination is moved to the past-center position wherein the point 31 falls below the line drawn between the centers 29—33.

The action of the toggle or "breaking" link mechanism is designed to exert sufficient force to assist the final closing movement of the door. This is advantageous as this wedging or tightening action is sufficient to draw the door into tight engagement with the jamb 8, insuring a flush outer surface.

This arrangement offers the further advantage of eliminating the need for separate timing or sequencing means such as are generally required in conjunction with landing gear and fairing door installations. These frequently take the form of hydraulic valves or limit switches, adding weight to the aircraft and complexity to its operation and maintenance, not the least of which are problems of servicing and adjustment. The present arrangement in providing a mechanism capable of accomplishing the desired results includes the required sequence of operation as an inherent characteristic.

The door or closure has been illustrated in the drawings and described herein as more particularly applied to the closure for an opening within an aircraft body through which a landing gear would be extended or retracted. The space within which the landing gear or wheel would be housed might more properly be termed the wheel well and the closure for covering such a well is generally designated as a fairing. As indicated above, however, the features of the present invention are applicable to other closures than that described.

Other forms and modifications of the present invention, both with respect to its general arrangement and details of its respective parts, which will occur to those skilled in the art after reading the present description, are all intended to come within the scope and spirit of the invention as more particularly defined in the appended claims.

I claim:

1. In a closure operating system, a closure pivotally mounted upon a supporting structure, an actuating motor operatively attached at one terminal to said closure, said actuating motor pivotally connected at its other terminal to a first arm of a bell-crank pivotally mounted upon the supporting structure, latching means pivotally carried upon the supporting structure adapted for engagement by said closure, toggle linkage pivotally interconnected between said latching means and the supporting structure, and push-pull means pivotally interconnected between the second arm of said bell-crank and an intermediate pivot upon said toggle linkage arranged to transmit the extending movement of said actuating motor to break said toggle linkage and through said toggle linkage to said latching mechanism for the initial unlocking of said closure latching mechanism simultaneously with the application of the opening force to said closure by the first said terminal of said actuating motor.

2. In a closure operating and locking system, a closure pivotally mounted upon a supporting structure, said closure carrying a latch-engaging element, an actuating motor operatively attached at one terminal to said closure, said actuating motor pivotally attached at its other terminal to an arm of a bell-crank pivotally mounted upon the supporting structure, latching means pivotally carried upon the supporting structure adapted for engagement with said closure-carried latch-engaging element, toggle linkage pivotally interconnected between said latching means and the supporting structure, and push-pull means pivotally interconnected between the second arm of said bell-crank and an intermediate pivot upon said toggle linkage arranged to apply the operating force of said actuating motor to break said toggle linkage beyond its dead-center and to also apply said operating force to said latching mechanism for the unlocking of said closure simultaneously with the application of the opening force thereto.

3. A door operating and locking arrangement comprising a door pivotally mounted upon a supporting structure, an extensible actuating motor operatively connected at a first of its terminals to said door, a latch mechanism pivotally mounted upon the supporting structure engageable by said door, a toggle linkage pivotally interconnected between said latch mechanism and the supporting structure, and lever means pivotally mounted upon said supporting structure having a terminal pivotally attached to the second terminal of said actuating motor, said lever means having a further terminal operatively connected to said toggle linkage intermediate its pivotal connection to said latch mechanism and to the supporting structure, said lever means arranged to direct the extending movement of said actuating motor to said intermediate pivotal connection for the breaking of said toggle linkage beyond its dead-center and the unlocking of said latch mechanism simultaneously with the application of the door opening force by the first said terminal of said actuating motor.

4. The combination with a closure movably mounted upon a supporting structure, a latch engaging portion carried by said closure, latch mechanism pivotally carried upon said supporting structure and engageable by said closure-carried latch-engaging portion, toggle linkage operatively connected to the supporting structure and to said latch mechanism for moving the latch mechanism to unlatched position and retaining the same in latched or unlatched position, and an actuating motor operatively connected at a first terminal to said closure for the opening and closing thereof, of lever means pivotally carried upon said supporting structure and operatively attached at a second terminal to said actuating motor and to said toggle linkage, said lever means arranged to provide a reactive support for said actuating motor to insure initial operation of said toggle linkage and unlocking of said latch mechanism by movement of said second motor terminal simultaneously with the application of opening forces to said closure by movement of said first motor terminal.

5. In combination, a structure having an opening therein, a door for said opening in said structure, a latch for said door pivotally mounted upon said structure, linkage means for moving said latch to locked and unlocked positions of said door, and extensible actuating means for simultaneously exerting a force on said door and on said latch-moving linkage means, said latch-moving linkage means including toggle linkage means having over dead-center arrangements and resilient means for retaining the same in either locked or unlocked positions, said toggle linkage means comprising a pair of intermediately pivoted links separately pivoted to said structure and to said latch.

6. In combination, a structure having an opening therein, a door for said structure, a latch for said door, toggle means for moving said latch to locked and unlocked positions, extensible actuating means for simultaneously exerting a force by its extension in opposite directions on said door and on said toggle means, said toggle means having over dead-center arrangements and resilient means for retaining the latch in either locked or unlocked positions, and said latch having a lug for engagement with said door to initiate movement of said toggle means from unlocked to locked position.

7. A device as recited in claim 6 in which said actuating means comprises piston and cylinder elements, one of which is operatively connected to said door and the other of which is connected to said toggle means.

8. In a closure operating system including a supporting structure, a closure movably supported upon said structure, a detent carried by said closure, a latch mechanism arranged for engagement with said detent for retaining said closure in its closed position, closure operating mechanism connected to said closure, and latch operating mechanism connected to said latch mechanism, the improvement of extensible actuating means having two oppositely movable terminals, a first of said terminals connected to said closure operating mechanism and the second said terminal connected to said latch operating mechanism arranged in such manner that oppositely directed forces exerted by said extending actuating means are automatically caused to actuate said latch operating mechanism for the unlatching of said closure prior to the actuation of said closure operating mechanism and limit means effective upon the unlatching of said closure to arrest further movement of the latch-connected terminal of said actuating means for effecting movement of said other terminal and its opening of said closure.

9. An operating mechanism for a closure, including a latch for said closure, said latch being pivotally mounted upon adjacent supporting structure, an intermediately hinged breaking linkage pivotally connected to adjacent structure and to said latch for said closure, closure actuating means pivotally connected at a first terminal to said closure and pivotally connected at a second terminal to a lever pivotally mounted upon said supporting structure, and push-pull means pivotally associated with said lever and said intermediately hinged breaking linkage for breaking said linkage for the unlatching of said closure upon initial movement of said closure actuating means through said second terminal connection to said lever prior to the operation of said closure by said closure actuating means through said first terminal pivotal connection.

10. An operating mechanism for a closure, including a latch for said closure, said latch being pivotally mounted upon adjacent supporting structure, an intermediately hinged breaking linkage pivotally connected to adjacent structure and to said latch for said closure, closure actuating means pivotally connected at a first terminal to said closure and pivotally connected at a second terminal to a lever pivotally mounted upon said supporting structure, push-pull means pivotally associated with said lever and said intermediately hinged breaking linkage for breaking said linkage for the unlatching of said closure upon initial movement of said closure actuating means through said second terminal connection to said lever prior to the operation of said closure by said closure actuating means through said first terminal pivotal connection, and resilient means associated with said breaking linkage arranged to resiliently retain said linkage in both the latched and unlatched positions of said closure.

11. In combination, a structure having an opening therein, a door for said opening in said structure, a latch for said door pivotally mounted upon said structure, linkage means for moving said latch to locked and unlocked positions of said door, extensible actuating means for simultaneously exerting a force on said door and on said latch-moving linkage means including toggle linkage means having an over dead-center arrangement and resilient means for retaining said latch in either locked or unlocked positions, said toggle linkage means comprising a pair of intermediately pivoted links separately pivoted to said structure and to said latch, said latch including a lug portion for engagement by said door arranged to initiate movement of said pivotally mounted latch from its unlocked to its locked position.

FRED A. PAYNE, Jr.

REFERENCES CITED

The following references are of record in the file of this patent:

UNITED STATES PATENTS

| Number | Name | Date |
| --- | --- | --- |
| 1,037,267 | Knight | Sept. 3, 1912 |
| 1,042,800 | Kitchen et al. | Oct. 29, 1912 |
| 1,849,887 | Siggins et al. | Mar. 15, 1932 |
| 2,116,446 | Niskimura | May 3, 1938 |
| 2,301,950 | Hulse | Nov. 17, 1942 |
| 2,322,372 | Levy | June 22, 1943 |